United States Patent [19]
Thompson

[11] Patent Number: 5,739,658
[45] Date of Patent: Apr. 14, 1998

[54] NOISE DITHERING SYSTEM FOR TRANSISTOR SWITCHED DEVICES

[75] Inventor: Guy Alan Thompson, Tucson, Ariz.

[73] Assignee: International Business Machines Corporation, Armonk, N.Y.

[21] Appl. No.: 757,121

[22] Filed: Dec. 3, 1996

Related U.S. Application Data

[63] Continuation of Ser. No. 415,008, Mar. 31, 1995, abandoned.

[51] Int. Cl.$^6$ .................................................. G05B 11/01
[52] U.S. Cl. ........................ 318/599; 318/631; 318/811; 388/811; 363/41
[58] Field of Search .................... 318/810, 807, 318/811, 599, 631; 388/811, 809, 831; 363/39, 41

[56] References Cited

U.S. PATENT DOCUMENTS

| | | | |
|---|---|---|---|
| 3,886,431 | 5/1975 | Meier . | |
| 3,916,285 | 10/1975 | Iwat et al. . | |
| 4,047,083 | 9/1977 | Plunkett | 363/41 |
| 4,074,347 | 2/1978 | Hall | 363/158 |
| 4,214,198 | 7/1980 | Schneider | 307/16 |
| 4,459,651 | 7/1984 | Fenter | 363/21 |
| 4,516,038 | 5/1985 | Glennon | 307/264 |
| 4,675,802 | 6/1987 | Sugimoto | 363/41 |
| 4,691,269 | 9/1987 | Yamane et al. | 363/98 |
| 4,700,285 | 10/1987 | Szepesi | 363/97 |
| 4,724,366 | 2/1988 | Neesz | 318/301 |
| 4,757,241 | 7/1988 | Young | 318/259 |
| 4,870,499 | 9/1989 | Suzuki et al. . | |
| 5,013,931 | 5/1991 | Estes, Jr. | 307/261 |
| 5,051,880 | 9/1991 | Harm | 363/49 |
| 5,086,382 | 2/1992 | Feldtkeller | 363/21 |
| 5,089,925 | 2/1992 | Lester | 361/55 |
| 5,105,165 | 4/1992 | Fisher et al. | 330/149 |
| 5,130,561 | 7/1992 | Elliott | 307/31 |
| 5,173,847 | 12/1992 | Suzuki | 363/21 |
| 5,180,964 | 1/1993 | Ewing | 323/222 |
| 5,196,778 | 3/1993 | Hayashida | 318/807 |
| 5,207,520 | 5/1993 | Tanaka | 400/279 |
| 5,225,749 | 7/1993 | Watanabe | 318/464 |
| 5,355,136 | 10/1994 | Katagiri | 341/157 |
| 5,427,461 | 6/1995 | Hirai et al. . | |

FOREIGN PATENT DOCUMENTS 89-136572  5/1989  Japan ........................... H02M 7/48

*Primary Examiner*—John W. Cabeca
*Attorney, Agent, or Firm*—Baker Maxham Jester & Meador

[57] ABSTRACT

A noise dithering system provides gating signals to switching transistors that selectively apply power to an output device in response to the gating signals, wherein said gating signals include a selected level of frequency modulation insufficient to alter operational characteristics of the output device more than a predetermined amount. One embodiment concerns a PWM switching system in which a PWM controller provides gating signals to switching transistors, where the gating signals are clocked by a timing circuit in accordance with a modulated input reactance sensed by a timing input node. In another embodiment, the gating signals may be clocked by the timing circuit in accordance with a modulated current at a timing input node, provided by a variable current source. In the case of the modulated input reactance, a voltage variable capacitor is preferably used to provide a capacitance proportional to output of a modulator. The modulator is operated to repeatedly vary the reactance about a predetermined level, in a manner that is insufficient to alter operational characteristics of the output device in excess of a selected level.

36 Claims, 8 Drawing Sheets

NOISE DITHERING SYSTEM FOR TRANSISTOR SWITCHED DEVICES

This application is a continuation of application Ser. No. 08//415,008, filed Mar. 31, 1995, now abandoned.

BACKGROUND OF THE INVENTION

1. Field of the Invention

The present invention relates to transistor switched systems such as power supplies and pulsewidth modulated ("PWM") motors. More particularly, the invention concerns a noise dithering system, where a modulated timing signal is used to dither a PWM controller's transistor gating signals, thereby reducing electrical switching noise without substantively affecting the performance of the system's output device.

2. Description of the Related Art

A variety of circuits today advantageously employ PWM. PWM provides benefits such as low power dissipation, high efficiency, and few electrical components. FIG. 1 depicts a circuit 100 representing a typical application of PWM. In most PWM applications, a PWM control chip 102 manages switching transistors 104–105 that apply PWM to an output device 108. Where the output device 108 is a motor, for example the transistors 104–105 function to drive the motor. In another application, the circuit 100 may constitute a power supply, where the output device 108 is a step-down transformer and the transistors 104–105 chop a D.C. input voltage to provide the transformer with an A.C. input waveform.

A typical PWM control chip 102 provides transistor gating signals on a pair of output lines 110–111, where the gating signals are generated in response to input data signals received on control voltage input lines 114. The gating signals are also responsive to the value of a capacitor 116 connected to a timing input line 118. Specifically, the capacitance of the capacitor 116 determines the fundamental operating frequency of the PWM control chip 102.

As shown in FIG. 2, the timing input line 118 is typically connected to a timing circuit 200 that provides a timing signal on a timing output line 202. The timing signal is directed to gating circuitry 203 that provides appropriate electrical signals on the lines 110–111 to coordinate gating of the switching transistors 104–105. In the example of FIG. 2, the timing circuit 200 includes a comparator 204, a feedback transistor 208, and a voltage divider 210. The frequency of the timing circuit 200 is determined by an input provided to a timing input node 212, which is influenced by a current source 206 and the capacitor 116, as follows. In particular, the capacitor 116 gradually charges under influence of the current source 206. Then, when the signal on the timing output line 202 reaches the threshold of the comparator 204, the transistor 208 is gated and the timing input node 212 is grounded, thereby discharging the capacitor 116. This process repeatedly charges and discharges the capacitor 116, thereby creating a sawtooth signal on the timing output line 202.

The timing signal on the timing output line 202 is fed to the gating circuitry 203. The gating circuitry 203 compares the timing signal with the signal from the control voltage input line 114 to determine the intersection between the signals, and produces pulsewidth modulated transistor gating signal on the lines 110–111 according to those intersections. The gating signals 110–111 are complementary to each other, and the output device 108 is driven by changing the duty cycle of the gating signals to the transistors 104–105.

If for example, the output device is an electric motor, the motor 108 maybe rotated in a given direction at a given speed by providing a gating signal of a selected duty cycle greater than 50% to the transistor 104, and providing a complementary gating signal less than 50% duty cycle to the transistor 105.

PWM arrangements such as the circuit 100 satisfy their users' expectations in many different cases. This type of circuit, for example, is frequently used to drive D.C. motors in various applications. With certain types of sensitive equipment, however, the equipment's accuracy may suffer somewhat as a result of the electrical noise resulting from large voltages and currents gated by the switching transistors 104–105. For example, PWM switching noise may be especially troubling where the output device is a magnetic tape drive motor. PWM circuits usually operate at low frequencies, such as 10 kHz to a few hundred kHz. In magnetic tape drives, the PWM fundamental frequency and its harmonics often exist in the same frequency band in which the tape drive's recording channel operates. In some cases, the PWM noise can even synchronize to tape motion, and its amplitude can vary with the load on the tape drive motor due to tape drag. Additionally, preamplifiers of some magnetic tape drive heads employ surface mounted inductors that can be especially receptive to PWM switching noise radiated from the motors.

Engineers have developed a number of remedies to such noise problems by employing different types of electrical devices to electrically shield power and signal lines. Most of these shields, however, include ferrous materials such as steel and iron, which add bulk and expense to the product. With the increasing demands in the electronics industry for compactness and cost effectiveness, the known PWM switching circuits may not be completely satisfactory for certain applications.

SUMMARY OF THE INVENTION

The present invention concerns a noise dithering system, where a PWM controller provides transistor gating signals to switching transistors that selectively apply power to an output device in response to the gating signals. In accordance with the invention, the gating signals are provided with a selected amount of frequency modulation, sufficient to reduce the transistors' electrical switching noise, but generally insufficient to alter operational characteristics of the output device.

In one embodiment of the invention, the transistor gating signals of the PWM controller are clocked in accordance with the output of a timing circuit, whose frequency depends upon the electrical signal at an input node. The invention varies a current into the input node or a reactance connected to the input node, to vary the signal at the input node and thereby frequency modulate the output signal of the timing circuit. If reactance is to be varied, a voltage variable capacitor such as a varactor is preferably used to provide a capacitance proportional to a modulated output signal produced by a modulator. The modulator is operated to vary the capacitance in a manner that is insufficient to alter operational characteristics of the output device in excess of a selected level, but sufficient to dither the transistors' switching noise. Alternatively, if the current into the input node is to be varied, a variable current source is used.

The invention affords its users with a number of distinct advantages. First, the invention provides a PWM controller that distributes PWM switching energy over a broad range of frequencies, rather than allowing the switching energy to exist at a discrete frequency. Additionally, since the noise is randomized and appears as broadband noise, in magnetic tape drives this noise is unrelated to signals generated by reading the tape medium.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Structure

Broadly, the present invention includes a PWM controller that provides transistor gating signals to switching transistors, which selectively apply power to an output device. In accordance with the invention, the gating signals include a selected level of frequency modulation, which is generally insufficient to alter operational characteristics of the output device.

In accordance with an exemplary embodiment of the invention, the gating signals may be frequency modulated by operating a timing source to electrically vary the signal on a timing input node of a timing circuit of the PWM controller. In one embodiment (FIG. 3), the timing input signal may be varied by using a timing source to change the reactance sensed by the timing input node. In another embodiment (FIG. 4), the signal on the timing input node may be varied by using a timing source to provide a changing current to the timing input node.

Variable Reactance

Figure 3:
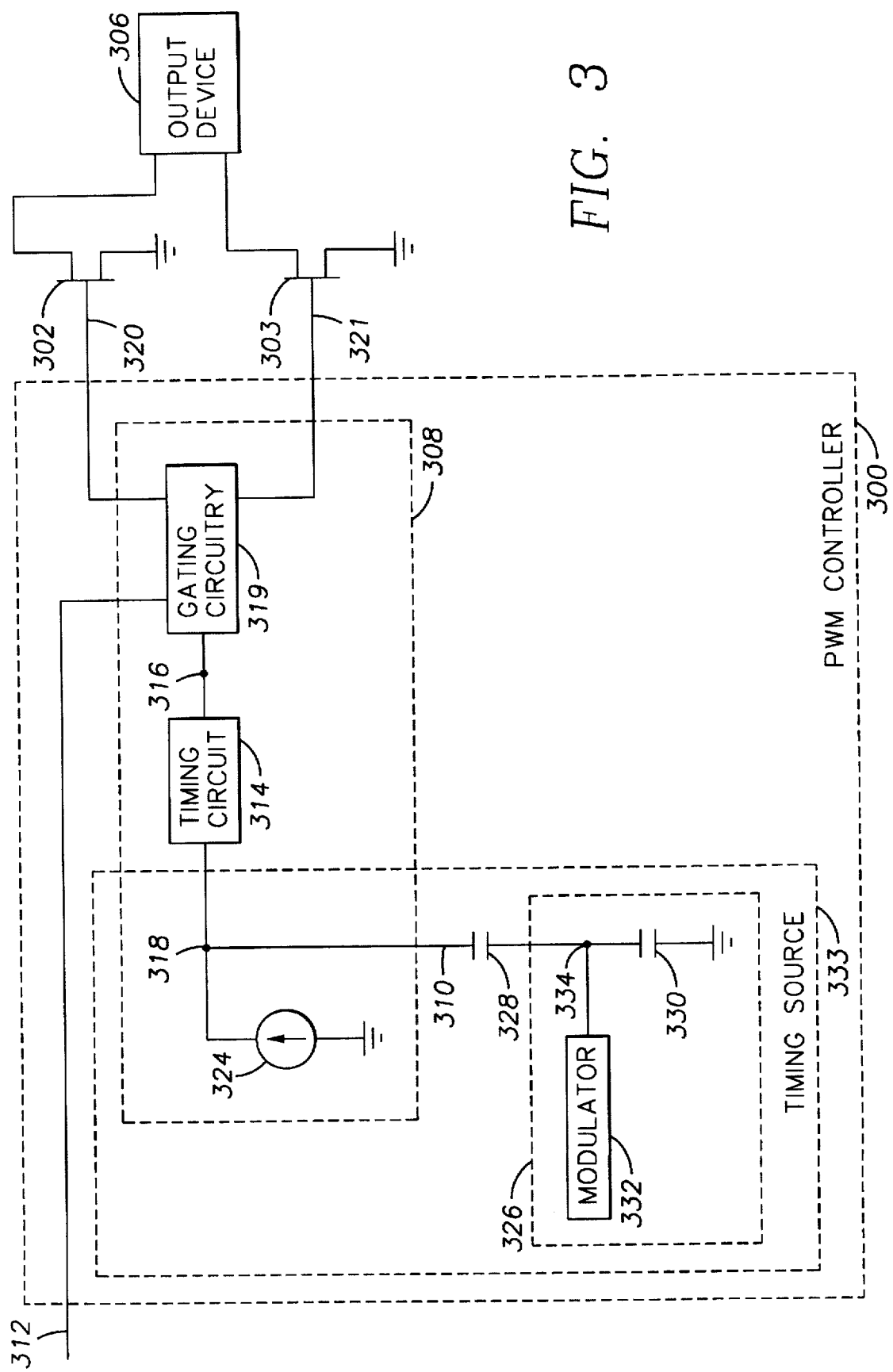
FIG. 3 is a schematic diagram of one embodiment of PWM controller of the invention, illustrated in the context of an exemplary application.

A first embodiment of the present invention frequency modulates the timing input signal of a PWM controller by changing the reactance sensed by a timing input node. FIG. 3 depicts an implementation of this embodiment. In FIG. 3, a PWM controller 300 is electrically connected to a pair of switching transistors 302–303, which provide pulsewidth modulated signals to an output device 306.

The PWM controller 300 includes a PWM control unit 308, having a timing input line 310, at least one control voltage input line 312, and output lines 320–321. The signal received on the control voltage input line 312 may be an analog voltage, as in the illustrated embodiment. However, this signal may comprise an analog current or a digital signal. If a digital signal is used, a digital-to-analog connecter is preferably interposed between the line 312 and the gating circuitry 319. The PWM control unit 308, in an illustrative embodiment, may comprise a Motorola model MC34163 power switching regulator. The PWM control unit 308 includes a timing circuit 314, which provides a timing output signal on a timing output node 316 in response to a signal present on a timing input node 318. Signals from the timing output node 316 and the control voltage input line 312 are processed by gating circuitry 319 to develop transistor gating signals on the gating output lines 320–321. The gating circuitry 319 may employ, for example, logic circuitry and techniques that are already well known in the art.

The frequency of the timing output signal (on the timing output node 316) is established by operating a timing source 333 to bias the timing input node 318. In the first embodiment, the timing source 333 includes a current source 324 that provides a fixed amount of current to the node 318. The timing source also includes a variable reactance 326 that provides a varying level of reactance coupled to the timing input line 310, which is sensed by the node 318 as discussed in greater detail below. The variable reactance 326 is electrically connected to a node 334. The variable reactance 326 is fluctuated, thereby creating a frequency modulated timing signal at the timing output node 316. As a result, the gating signals applied to the transistors 302–303 are also frequency modulated, thereby dithering the electrical switching noise experienced by the output device 306 as described in greater detail below.

Preferably, the variable reactance 326 comprises a variable capacitance. However, if desired, a variable inductance may be used. In the case where capacitance is used, as in the illustrated embodiment, the variable reactance (capacitance) 326 includes a voltage variable capacitor 330 and a modulator 332. In the first embodiment of the invention, the variable capacitance 326 comprises a Motorola model MV2115 varactor diode circuit. Alternatively, however, the variable capacitance 326 may be provided by a junction between two regions of a bipolar junction transistor, or another suitable voltage variable capacitor whose capacitance may be varied in response to an input voltage signal. In the illustrated embodiment, the varactor diode 330 provides a capacitance that varies in response to a modulator signal provided by the modulator 332.

In this respect, the modulator 332 preferably comprises a source of a waveform that continually varies about a predetermined level. The modulator 332 is preferably configured to provide a periodic waveform such as a triangular wave, but other waveforms may be used instead, such as sinusoidal or sawtooth waveforms and the like. In this regard, the modulator 332 may comprise a voltage modulator such as a model 555 timer. Alternatively, the modulator 332 may comprise a white noise generator, or another suitable modulator. To achieve optimum noise reduction, the waveform of the modulator 332 preferably has an average frequency that is at least ten times lower than the switching frequency of the transistors 302–303.

A D.C. blocking capacitor 328 may be electrically interposed between the variable capacitance 326 and the timing input line 310, if desired, to prevent coupling of the voltage signal from the modulator 332 to the timing input node 318, and possibly disturbing the operation of the timing circuit. Additionally, to avoid affecting the value of the capacitance sensed by the timing input node 318, the capacitance of the D.C. blocking capacitor 328 is preferably at least ten times greater than the capacitance of the variable capacitance 326.

Variable Current

Figure 4:
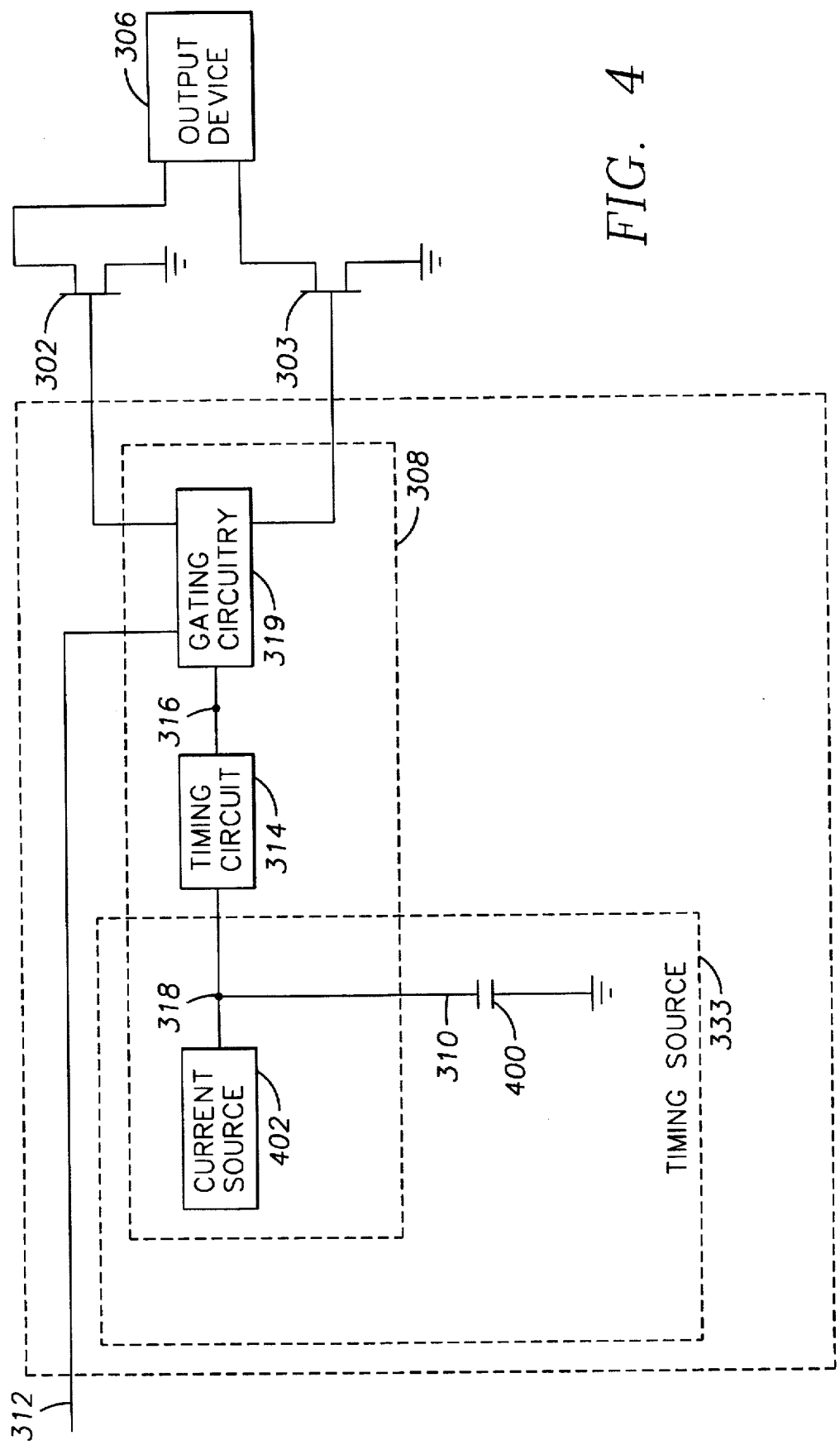
FIG. 4 is a schematic diagram of another embodiment of PWM controller of the invention, illustrated in the context of an exemplary application.

As an alternative to the circuitry of FIG. 3, this invention may instead be implemented in a second embodiment to provide a changing current to the timing input node to frequency modulate the transistor gating signals. FIG. 4 depicts this embodiment of the invention, in which many components may be the same as in FIG. 3. However, instead of using the variable reactance 326, the timing source 333 includes a fixed-value reactance 400 connected to the input line 310. As an example, the reactance 400 may comprise a fixed value capacitor.

Although the reactance 400 has a fixed value, the timing source 333 includes a variable current source 402 is used to alter the signal on the timing input node 318. In this second embodiment, the frequency of the timing output signal (on the timing output node 316) is determined by biasing the timing input node 318. In this regard, the fixed-value reactance 400 provides a predetermined level of reactance between the node 318 and electrical ground, while the current source 402 provides a varying level of current to the node 318.

In operation, the variable current source 402 is fluctuated, thereby creating a frequency modulated timing signal on the timing output node 316. As a result, the gating signals applied to the transistors 302-303 are also frequency modulated, thereby dithering the electrical switching noise experienced by the output device 306 as described in greater detail below.

Alternatively, both current and capacitance may be varied in combination, in an appropriate relationship to achieve the desired frequency modulation of the timing signal applied to the timing input node 318.

Operation Environments

Figure 5:
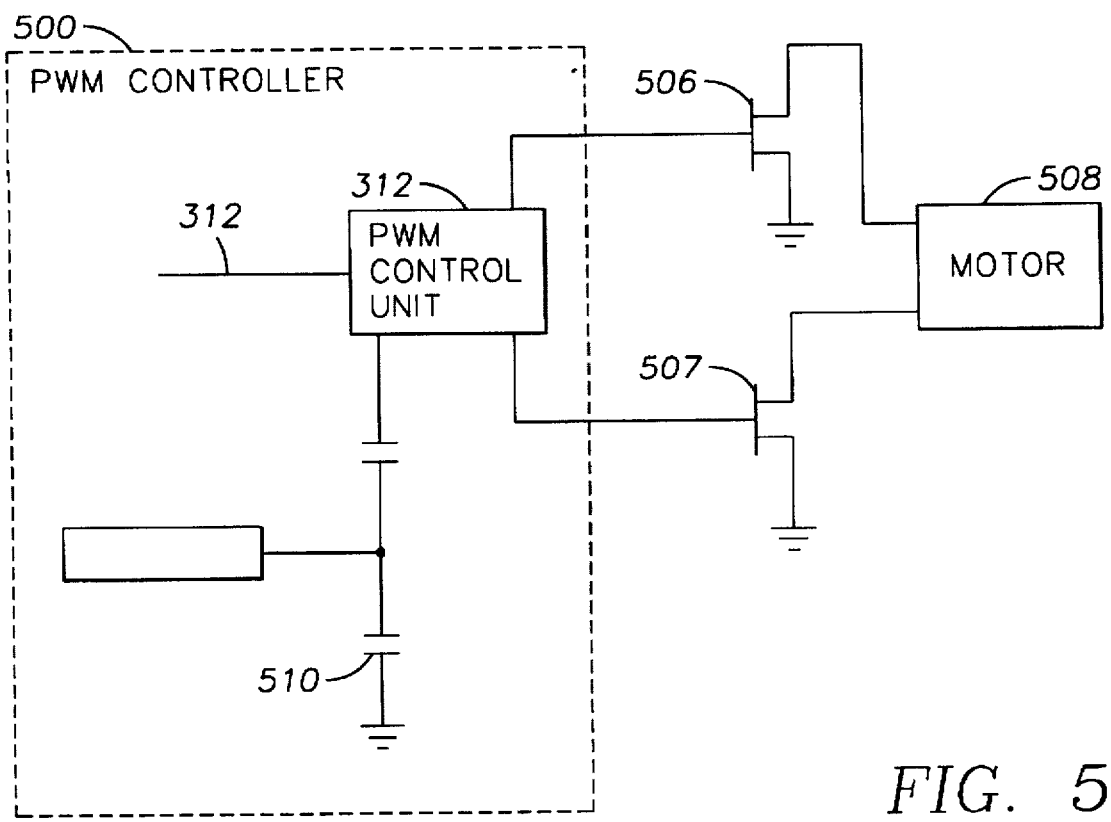
FIG. 5 is a schematic diagram of one exemplary implementation of a PWM controller of the invention, to drive a motor.

This invention may be applied in a number of different environments, using a number of different components. For example, the invention may be implemented to drive a motor 508, as shown in FIG. 5. This embodiment employs a PWM controller 500 that includes a PWM control unit 502 to provide gating signals to switching transistors 506-507, which selectively apply power to a motor 508. In this embodiment, the PWM control unit 502 includes similar circuitry as described above in conjunction with the PWM control unit 308. In the environment illustrated in FIG. 5, the frequency modulation of the invention may be achieved by a variable reactance 510 (as illustrated), or a variable current source (not shown). In an exemplary embodiment, the PWM control unit 502 may comprise a Motorola model MC34163 circuit, a Unitrode model UC36370W circuit, or a National Semiconductor model LM622 circuit. The motor 508 may comprise a brush or brushless D.C. motor, for example. In applications using a brushless D.C. motor, a commutator chip is also used, such as a National Semiconductor model LM621 circuit.

Figure 6:
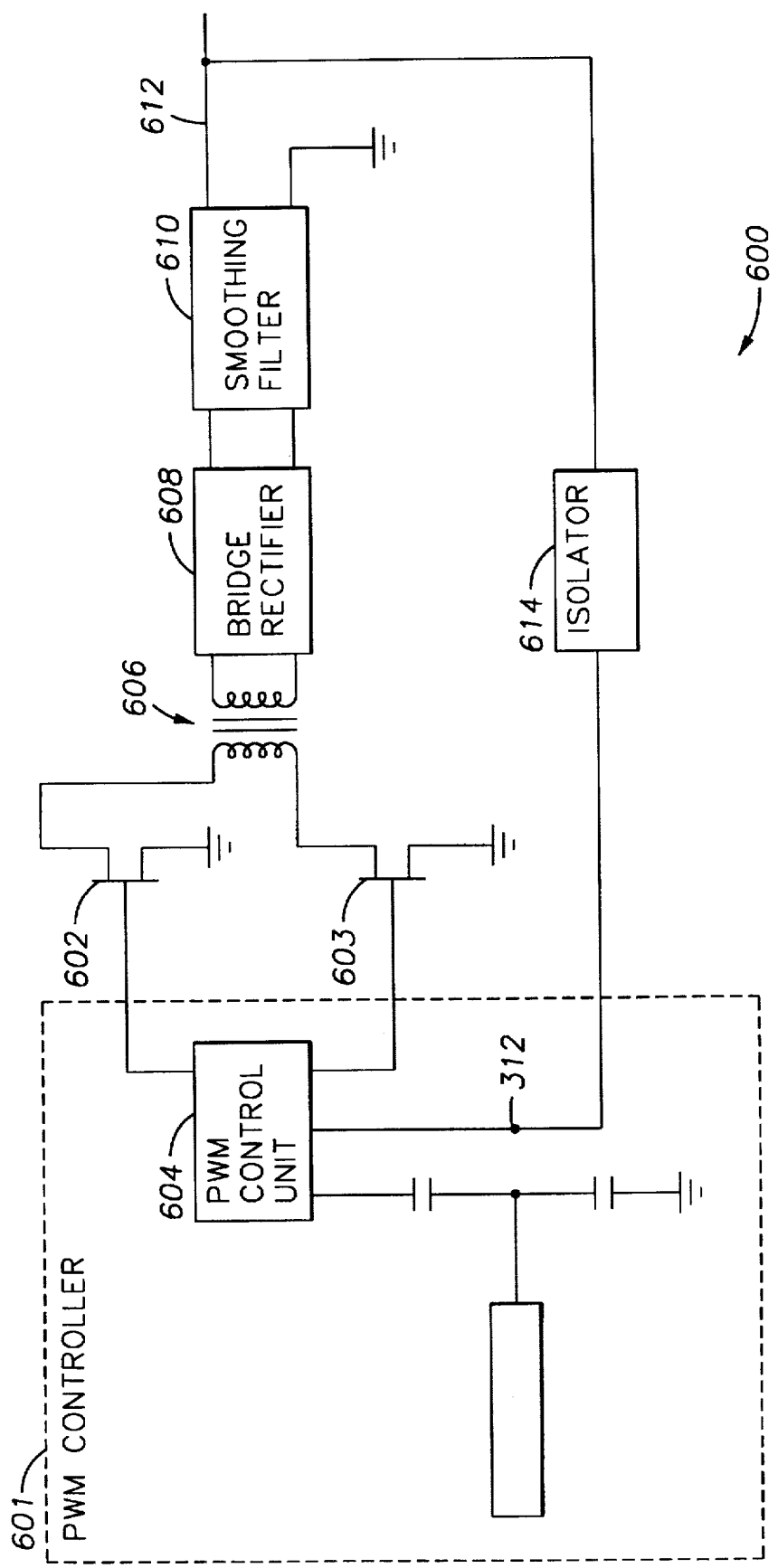
FIG. 6 is a schematic diagram of another exemplary implementation of a PWM controller of the invention, to provide a power supply.

In another application, the invention may be used in a switched mode power supply 600 (FIG. 6). Such a power supply 600 may be useful, for example, to provide a regulated voltage for use by a computer, computer monitor, an on-board DC-to-DC voltage converter, or another device. This application employs a PWM controller 601 that includes a PWM control unit 604 to provide gating signals to switching transistors 602-603, which selectively apply power to a transformer 606. Output from the transformer 606 is directed to a bridge rectifier 608, and then to a smoothing filter 610. The smoothing filter 610 includes an output line 612 that provides a regulated power supply voltage, for use by electrically powered devices (not shown) such as those described above. The power supply voltage on the line 612 also provides feedback to the controller 601, to assist the controller 601 in adjusting itself to properly gate the switching transistors 602-603. Advantageously, the power supply 600 may include an optoelectronic isolator 614 to prevent the transmission of electrical noise from the output line 612 to the PWM control unit 604. The isolator 614 may comprise a light emitting diode optically coupled to a phototransistor or photodiode, or another suitable arrangement.

In this application, the PWM control unit 604 includes similar circuitry as described above in conjunction with the PWM control unit 308. And, the PWM control unit 604 may employ a variable reactance (as illustrated), or a variable current source (not shown). In an exemplary embodiment, the PWM control unit 604 may comprise a Motorola model MC34163 circuit.

Operation

In addition to the various hardware devices and interconnections described above, the present invention also contemplates a noise reduction method. More specifically, the invention includes a method of noise reduction, achieved by providing frequency-modulated gating signals to switching transistors that apply power to an output device. The level of frequency modulation is limited to avoid altering operational characteristics of the output device.

Figure 1:
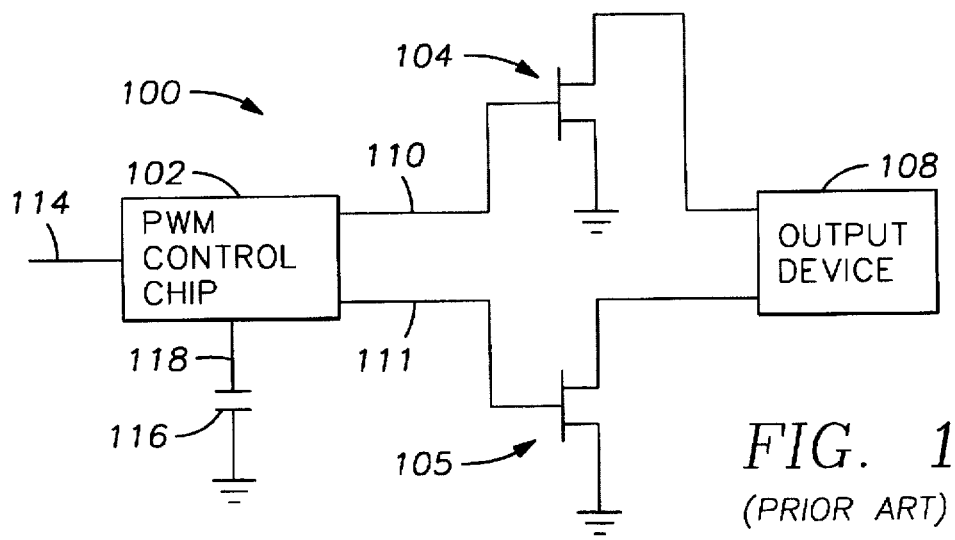
FIG. 1 is a schematic diagram of a circuit 100 that illustrates a typical use of PWM circuitry.
Figure 2:
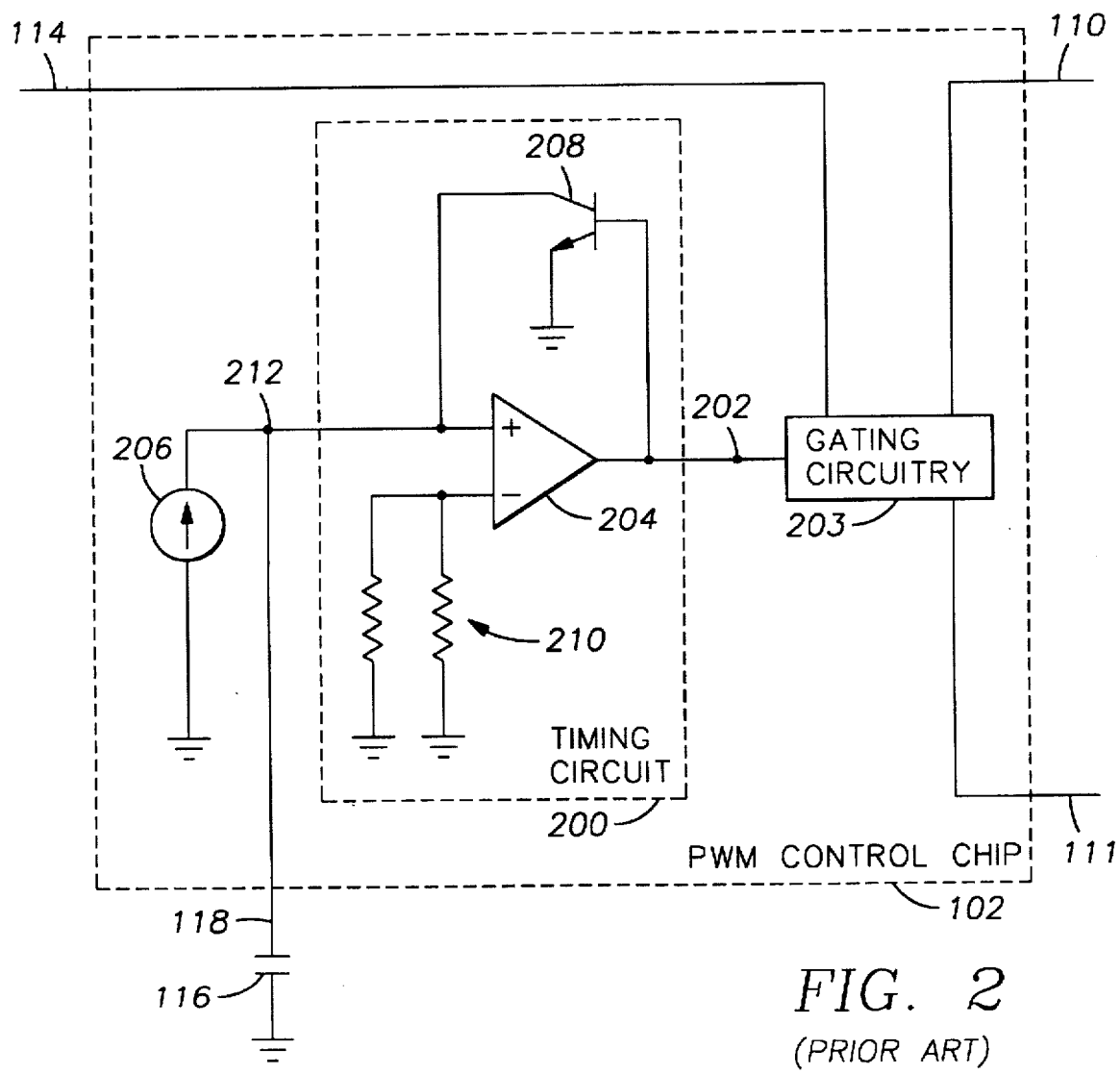
FIG. 2 is a detailed schematic diagram of a PWM control chip 102 of the circuit 100.

In known PWM circuits (e.g. FIGS. 1-2), a fixed value capacitor is attached to the input line 118, and a constant current source 206 is used; with this arrangement, the timing circuit 200 provides a fixed-frequency timing output signal 703 (FIG. 7B) at the node 202. The switching noise caused by the transistors 104-105 exhibits the noise frequency spectrum 705, having a fixed amplitude 706 at a fundamental frequency 705a (FIG. 7C). By comparing the bandwidth 707 of a typical magnetic tape recording channel to the noise frequency spectrum 705, it can be seen that the noise frequency spectrum 705 lies within the recording channel bandwidth 707. With known PWM circuits, then, the recording channel is influenced by the electrical switching noise of the transistors 104-105.

Figure 7A:
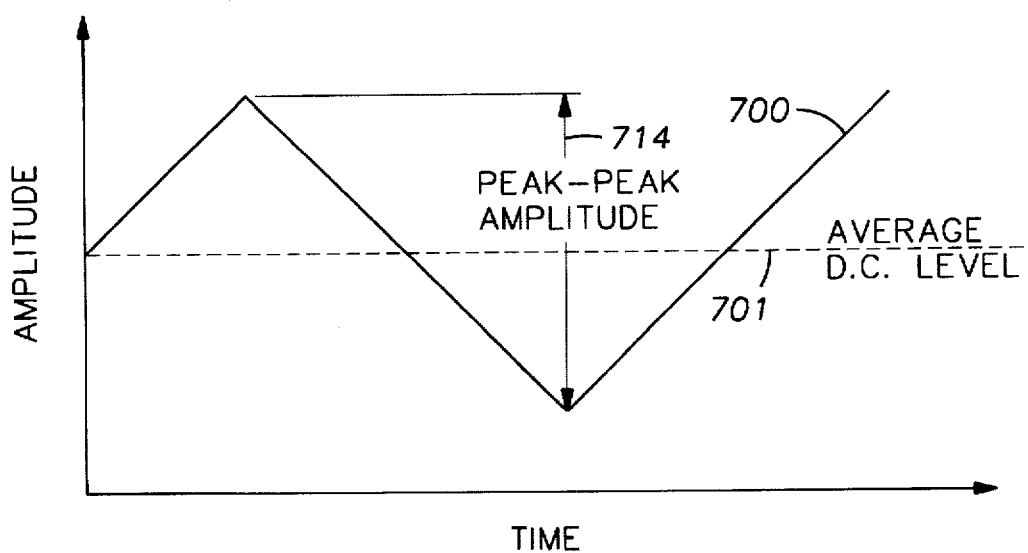
FIGS. 7A–7E depict various electrical signals useful in illustrating the operation of the present invention.
Figure 7B:
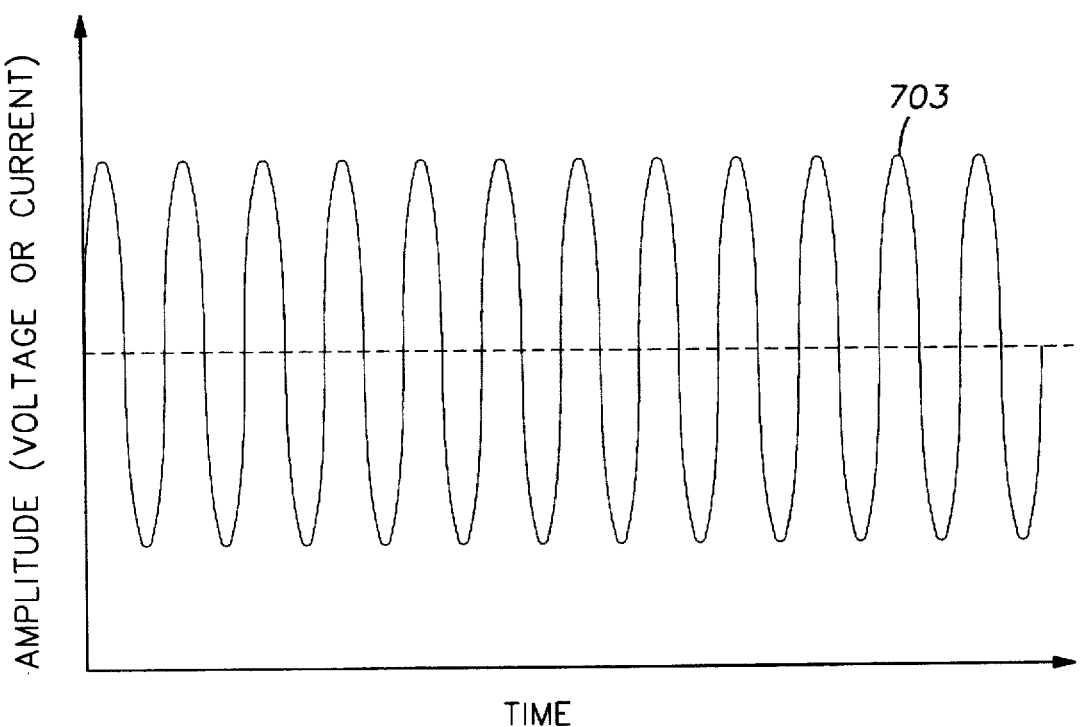
Figure 7C:
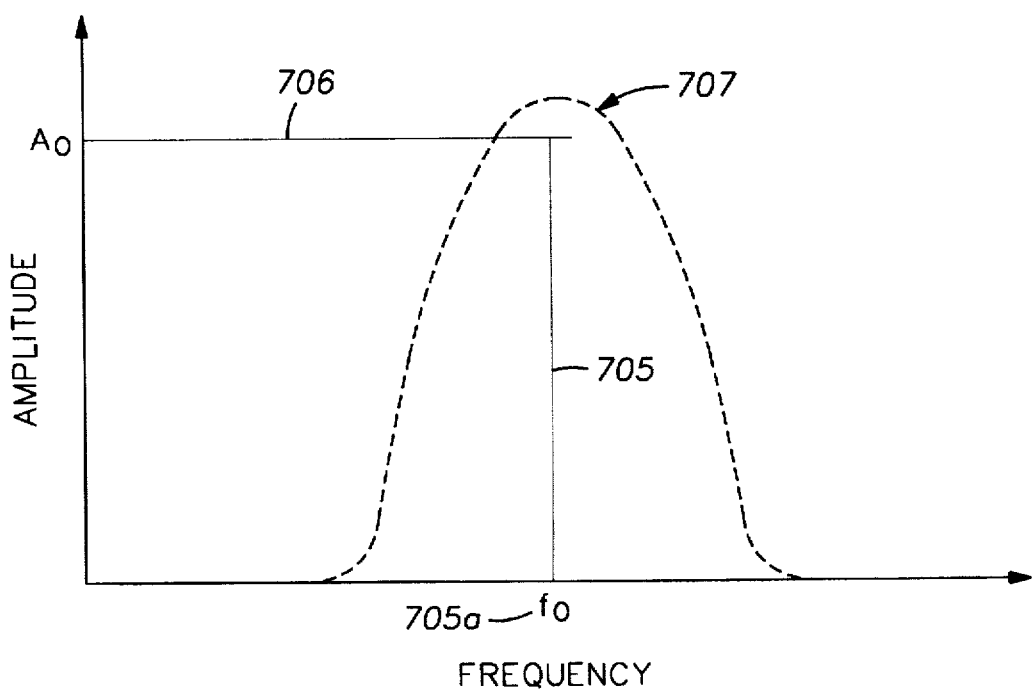

In contrast to known PWM circuits, the present invention employs the modulator 332 to provide a modulating waveform that preferably comprises a low frequency periodic triangular waveform 700 (FIG. 7A). This waveform 700, present at the node 334, represents a modulating signal that modulates the frequency of the timing output signal produced by the timing circuit 314, as explained below. The modulating waveform 700 oscillates about an average D.C. level 701, causing the capacitance of the varactor diode 330 to vary proportionally. The average D.C. level 701 may be zero, or another value may be selected in accordance with the invention. As mentioned above, the modulator 332 may instead provide another type of periodic signal, such as a sinusoid, a sawtooth, or another suitable waveform. The variable capacitance of the varactor diode 330 is coupled to the timing input line 310 via the D.C. blocking capacitor 328; hence, the varactor diode 330 is electrically coupled to the timing input node 318 and timing circuit 314. However, the relatively low frequency voltage signal output by the modulator 332 at the node 334 is not coupled to the input line 310 due to presence of the relatively high capacitance blocking capacitor 328.

Figure 7D:
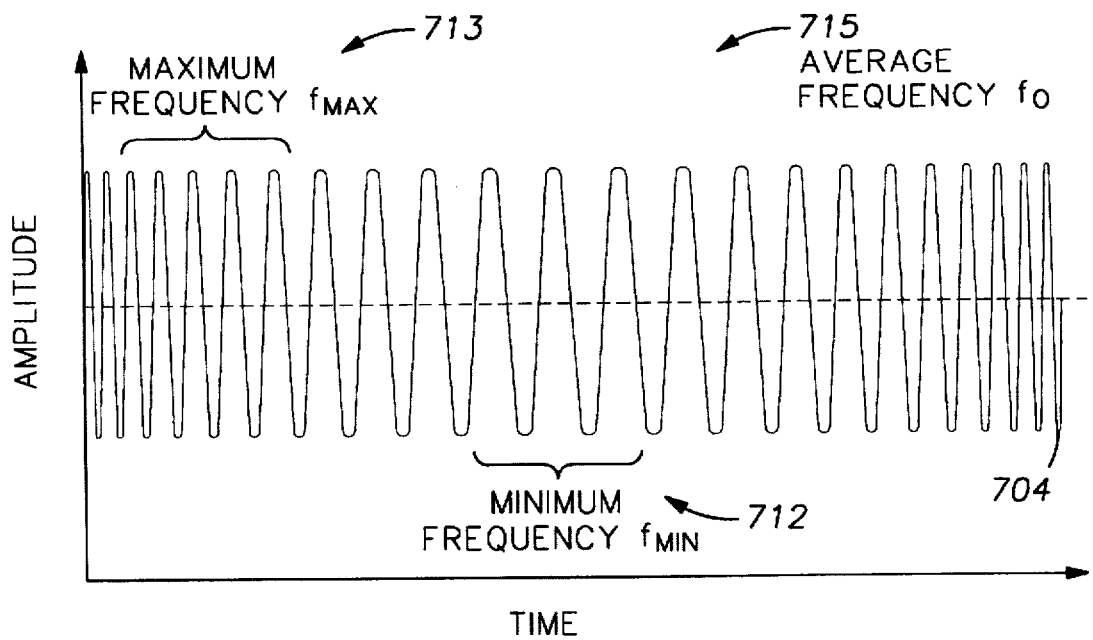

In contrast to known circuits, the variable capacitance 326 causes distortion (i.e. frequency modulation) of the timing output signal 703 at the node 316, as shown by the waveform 704 (FIG. 7D). Because the timing signal produced by the timing circuit 314 is frequency modulated, the gating circuitry 319 generates gating signals that are likewise frequency modulated. The waveform 704 exhibits a minimum oscillation frequency 712 and a maximum oscillation frequency 713. The difference between the minimum and maximum frequencies 712–713 may be adjusted by changing the peak-to-peak amplitude 714 of the modulating waveform 700 (FIG. 7A). Preferably, the amplitude 714 of the waveform 700 is selected such that the frequency modulation of the waveform 704 is not so large so as to adversely impact the operation of the output device 306. The average frequency 715 of the waveform 704 may be adjusted by changing the average D.C. level 701. Preferably the D.C. level 701 and the frequency of the modulating waveform 700 are selected such that the average frequency 715 of the waveform 704 is at least ten times greater than the frequency of the modulating waveform 700.

Figure 8:
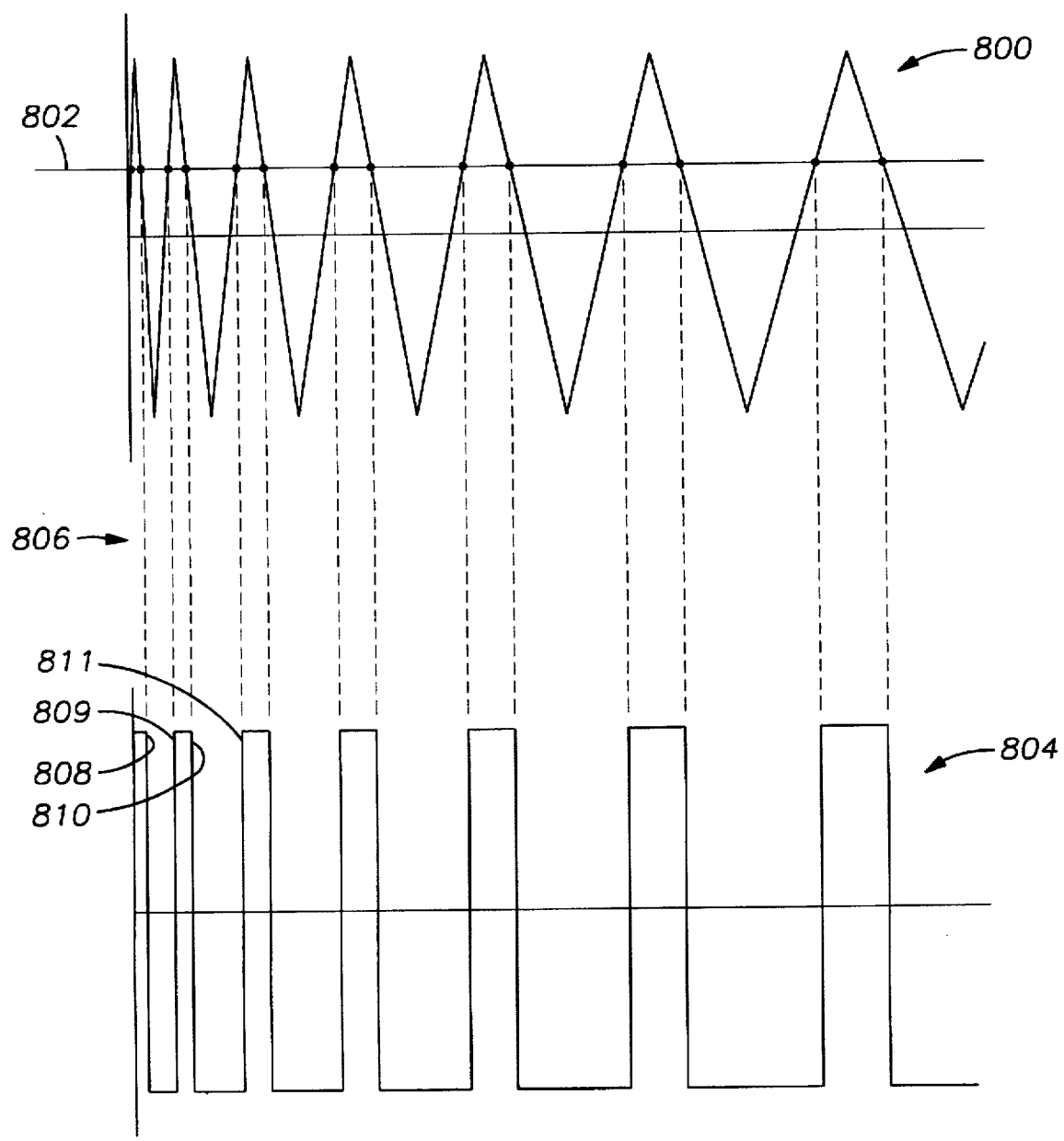
FIG. 8 illustrates the relationship between the timing, control voltage and transistor gating signals of the invention.

FIG. 8 illustrates the relationship between these signals in greater detail. Specifically, FIG. 8 depicts a timing output signal 800, typical of the waveform produced by the present invention at the node 316. The modulating waveform 700 may comprise another shape of signal instead, such as a sawtooth waveform. The signal 800 is shown with decreasing frequency, which results from the fluxuation of the modulating waveform 700 as discussed above. The waveform 700 is directed to the gating circuitry 319, along with a control voltage input signal 802 received on the control voltage input line 312. The gating circuitry 319 creates a pair of frequency modulated transistor gating signals upon the lines 320–321. As an example, the transistor gating signal 804 is generated upon the line 320. The frequency of the gating signal 804 varies proportionally to the modulating waveform 800. In an illustrative embodiment, the transition points (e.g. 808–811) may be determined by the points at which the waveform 700 and the signal 802 intersect, which are highlighted by the comparison lines 806. The gating circuitry 319 creates another waveform (not shown) on the line 321, this waveform being complementary to the waveform 804.

Figure 7E:
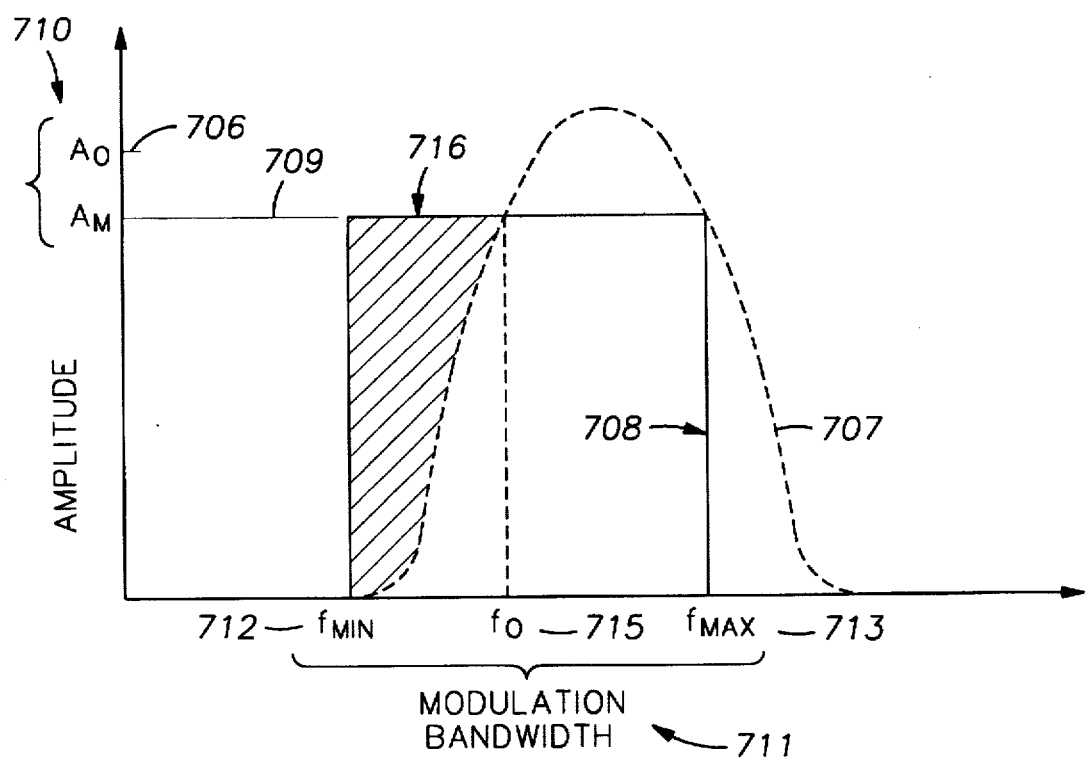

The switching transistors 302–303, then, are gated pursuant to a frequency modulated scheme. Accordingly, the switching noise created thereby is reduced, due to a number of factors. First, the noise frequency spectrum of the invention takes the form of the dithered noise spectrum 708 (FIG. 7E), which exhibits an amplitude 709. The noise spectrum exhibits a modulation bandwidth 711, between the maximum frequency 713 and the minimum frequency 712. In comparison to the noise frequency spectrum 705, the amplitude 709 has been reduced by an amount 710, which depends upon the modulation bandwidth 711 and the recording channel bandwidth 707. Therefore, by creating a dithered noise spectrum 708, a substantial amount of noise 716 is removed from the recording channel bandwidth 707. Additionally, the dithered noise spectrum 708 may be adjusted to further increase the removed noise 716 by shifting the average frequency 715, in the manner discussed above. The switching noise is also reduced by the "randomizing" effect of the present invention because the modulating waveform 700 is unrelated to the operation of the output device 306, and appears as broadband noise.

In most cases it is desirable to limit the extent of the frequency modulation applied to the timing circuit 314. Excessive oscillations might interfere with the efficient operation of the output device 306. Additionally, excessive frequency modulation in some cases may affect the motor's torque, rotational frequency, or other operational characteristics. Preferably, then, the extent of frequency modulation introduced by the invention is preferably limited to avoid affecting the operational characteristics of the output device beyond acceptable limits. These limits, of course, may vary from application to application. Some applications, for example, may dictate limiting frequency modulation in accordance with the invention to avoid any affect on the operation of the output device. Other applications, in contrast, may tolerate some change in the operation of the output device.

While there have been shown what are presently considered to be preferred embodiments of the invention, it will be apparent to those skilled in the art that various changes and modifications can be made herein without departing from the scope of the invention as defined by the appended claims.

What is claimed is:

1. A pulsewidth modulation (PWM) controller, comprising:
 a PWM control unit with a timing input node, and at least one gating node for producing pulsewidth modulated gating signals on the at least one gating node, said gating signals having a frequency proportional to an analog timing level experienced at the timing input node; and
 a timing source coupled to the timing input node for providing the timing level to the timing input node, the timing level repeatedly varying about a predetermined value such that, when the gating node is coupled to an electrical motor, the gating signals drive the electrical motor with electrical switching noise having a broadened bandwidth and reduced amplitude with respect to operation of the electrical motor while the timing level is constant at the predetermined value.

2. The controller of claim 1, wherein the timing level comprises an electrical current into the timing node and the timing source comprises:
 a variable current source connected to the timing input node for repeatedly varying the timing level about a predetermined level.

3. The controller of claim 2, wherein the at least one gating node is connected to an output device and the variable current source varies the timing level to maintain operational characteristics of the output device within predetermined limits.

4. The controller of claim 2, wherein the at least one gating node is connected to an output device and the variable current source varies the timing level to maintain operational characteristics of the output device.

5. The controller of claim 2, wherein the variable current source varies the timing level symmetrically about the predetermined level.

6. The controller of claim 2, wherein the variable current source varies the timing level in accordance with a sinusoidal pattern.

7. The controller of claim 2, wherein the variable current source varies the timing level in accordance with a triangular pattern.

8. The controller of claim 2, further comprising at least one switching transistor coupled to the at least one gating node.

9. The controller of claim 8, further comprising an output device electrically connected to the at least one switching transistor, wherein the output device comprises an electric motor.

10. The controller of claim 1, wherein the control unit comprises an application specific integrated circuit.

11. The controller of claim 2, wherein the control unit and the current source are included in a single integrated circuit.

12. The controller of claim 1, wherein the timing level comprises electrical reactance applied to the timing node input and the timing source comprises:
- a variable reactance connected to the timing input node to apply the timing level to the timing input node by providing a reactance proportional to a modulator signal; and
- a modulator electrically connected to the variable reactance to provide the modulator signal to repeatedly vary the reactance about a predetermined level.

13. The controller of claim 12, wherein the at least one gating node is connected to at least one switching transistor, the at least one switching transistor being coupled to an output device, and the modulator and the variable reactance vary the reactance in a predetermined manner to maintain operational characteristics of the output device within predetermined limits.

14. The controller of claim 12, wherein the at least one gating node is connected to at least one switching transistor, the at least one switching transistor being coupled to an output device, and the modulator and the variable reactance vary the reactance in a predetermined manner to maintain operational characteristics of the output device.

15. The controller of claim 12, wherein the modulator provides a modulator signal varying the reactance symmetrically about the predetermined level.

16. The controller of claim 12, wherein the modulator provides a modulator signal varying the reactance in accordance with a sinusoidal pattern.

17. The controller of claim 12, wherein the modulator provides a modulator signal varying the reactance in accordance with a triangular pattern.

18. The controller of claim 12, further comprising at least one switching transistor coupled to the at least one gating node.

19. The controller of claim 18, further comprising an output device electrically connected to the at least one gating node, wherein the output device comprises an electric motor.

20. The controller of claim 12, wherein the control unit comprises an application specific integrated circuit.

21. The controller of claim 12, wherein the control unit, variable reactance, and modulator are embodied in circuitry of a single integrated circuit.

22. The controller of claim 12, wherein the variable reactance comprises a varactor diode.

23. The controller of claim 12, wherein the variable reactance comprises a transistor.

24. The controller of claim 12, further comprising a blocking capacitor connected between the variable reactance and the timing input node.

25. The controller of claim 12, wherein the variable reactance comprises a variable capacitance.

26. The controller of claim 12, wherein the variable reactance comprises a voltage variable capacitance and the modulator provides a voltage signal.

27. A pulsewidth nodulation (PWM) device for producing a PWM signal, comprising:
- a timing source providing a dithering signal;
- a PWM control unit coupled to the source to produce a frequency-modulated PWM control signal in response to the dithering signal; and
- a PWM gating circuit coupled to the PWM control circuit to produce a PWM gating signal in response to the frequency-modulated PWM control signal, the PWM gating signal having a dithered noise spectrum.

28. A pulsewidth modulation (PWM) device for producing a PWM signal, comprising:
- a PWM signal generator which produces a PWM signal with a frequency proportional to a timing signal; and
- a timing source coupled to the PWM signal generator to supply the timing signal to the PWM signal generator, said timing signal comprising a waveform shaped to provide the PWM signal with a dithered noise spectrum by introducing a predetermined amount of frequency modulation to the PWM signal.

29. A method of noise reduction in a PWM system that includes switching transistors connected to an output device, said method comprising the steps of:
- providing gating signals to the switching transistors;
- operating the switching transistors in response to the gating signals to selectively apply power to an output device; and
- conditioning said gating signals with a selected level of frequency modulations, said frequency modulation being selected to reduce electrical switching noise by broadening bandwidth and reducing amplitude of the noise in comparison to the electrical switching noise without said frequency modulation.

30. The method of claim 29, wherein the selected level of frequency modulation is insufficient to alter operational characteristics of the output device.

31. The method of claim 29, wherein the frequency modulation is performed symmetrically about the predetermined level.

32. The method of claim 29, wherein the frequency modulation is performed in a substantially sinusoidal pattern.

33. The method of claim 29, wherein the frequency modulation is performed in a substantially triangular pattern.

34. The method of claim 29, wherein the output device comprises an electric motor.

35. The method of claim 29, wherein the gating signals are generated by a PWM control unit that clocks signals in response to a value of input capacitance connected to the PWM controller, said step of conditioning including repeatedly varying the input capacitance about a selected level.

36. The method of claim 29, wherein the gating signals are generated by a PWM control unit that provides the gating signals in response to a timing input signal received at a timing input node at the PWM control unit, and the frequency modulation is introduced by providing an oscillating electrical signal to the timing input node.

* * * * *